United States Patent [19]

Yan

[11] Patent Number: 5,552,063
[45] Date of Patent: Sep. 3, 1996

[54] PROCESS FOR TREATING WASTEWATER CONTAINING PHENOL, AMMONIA, AND COD

[75] Inventor: Tsoung Y. Yan, Wayne, Pa.

[73] Assignee: Mobil Oil Corporation, Fairfax, Va.

[21] Appl. No.: 515,773

[22] Filed: Aug. 16, 1995

Related U.S. Application Data

[63] Continuation-in-part of Ser. No. 227,749, Apr. 13, 1994, which is a continuation of Ser. No. 61,127, May 12, 1993, Pat. No. 5,338,463.

[51] Int. Cl.$^6$ ............................................ C02F 1/72
[52] U.S. Cl. ..................... 210/763; 210/908; 210/909
[58] Field of Search ............................. 210/763, 908, 210/909

[56] References Cited

U.S. PATENT DOCUMENTS

| | | | |
|---|---|---|---|
| 1,754,068 | 4/1930 | Travers et al. | 210/763 |
| 3,586,623 | 6/1971 | Kuhn | 210/63 |
| 4,537,686 | 8/1985 | Borbely et al. | 210/713 |
| 4,615,873 | 10/1986 | Devuyst et al. | 423/367 |
| 4,729,835 | 3/1988 | McNeillie et al. | 210/759 |
| 4,743,381 | 5/1988 | Bull | 210/759 |
| 5,120,453 | 6/1992 | Frame et al. | 210/759 |
| 5,207,925 | 5/1993 | Steiner et al. | 210/746 |
| 5,290,455 | 3/1994 | Rakszawski | 210/763 |
| 5,338,463 | 8/1994 | Yan | 210/763 |
| 5,376,285 | 12/1994 | Kurek et al. | 210/759 |

FOREIGN PATENT DOCUMENTS

| | | | |
|---|---|---|---|
| 3430484 | 2/1986 | Germany | 210/763 |
| 1065350 | 1/1984 | U.S.S.R. | 210/763 |
| 2043045 | 10/1980 | United Kingdom | 210/763 |

*Primary Examiner*—Neil McCarthy
*Attorney, Agent, or Firm*—Ronald A. Bleeker; Malcolm D. Keen; Gerald L. Harris

[57] ABSTRACT

The catalytic oxidation of offensive substances, such as cyanides, sulfides, sulfites, thiosulfates, mercaptans, disulfides, phenol, cresol, ammonia and mixtures thereof, contained in wastewater. The process involves contacting the wastewater with a source of oxygen over a catalyst comprising a combination of a Group VIII and a Group VIA metal or metal compound on a support that is inert in the hydrothermal conditions of the wastewater treatment. An example of the catalytic support is activated carbon and examples of the metal combinations include NiMo, NiW, and CoMo.

14 Claims, 2 Drawing Sheets

PROCESS FOR TREATING WASTEWATER CONTAINING PHENOL, AMMONIA, AND COD

CROSS REFERENCE TO RELATED APPLICATIONS

This is a Continuation-In-Part of U.S. application Ser. No. 08/227,749, filed Apr. 13, 1994, which in turn was a continuation of U.S. application Ser. No. 08/061,127, filed May 12, 1993, now U.S. Pat. No. 5,338,463, which are each incorporated herein by reference.

FIELD OF THE INVENTION

This invention is directed to reducing the concentration of offensive substances and to reducing the chemical oxygen demand of wastewater by oxidizing various offensive substances including, for example, cyanides, sulfides, sulfites, thiosulfates, mercaptans, disulfides, phenol, ammonia and mixtures thereof using a catalytic oxidation system which is operable without emitting undesirable amounts of catalytic material into the treated water. It is particularly directed at using a combination of Group VIII and Group VIA metal or metal compounds, such as NiMo, NiW, and CoMo, on a support that is inert in the hydrothermal conditions of the wastewater, such as activated carbon, to catalytically oxidize the above described offensive substances in wastewater.

Background

Wastewater streams from industrial plants, including petroleum refineries, chemical plants, pulp and paper plants, mining operations, electroplating operations, and food processing plants, can contain phenol, ammonia, and other offensive substances such as cyanides, sulfides, sulfites, thiosulfates, mercaptans, disulfides, and mixtures thereof, that tend to increase the chemical oxygen demand (COD) of the wastewater streams. Examples of these wastewater streams in petroleum refineries include sourwater, sourwater stripper bottoms, and spent caustics and the term "wastewater" is used herein to refer to the above described streams.

The Environmental Protection Agency (EPA) and various local agencies have placed limits on the allowable levels of these offensive substances in industrial wastewater effluent streams. It is desired to develop a process suitable for treating these streams to meet the regulatory limits.

Methods for COD reduction by reducing the concentration in the wastewater of one or more of these compounds include treatment of the wastewater by precipitation, incineration, biological oxidation, and chemical oxidation using peroxoacids, $H_2O_2$, $Cl_2$, NaOCl, $CO_2$, and $KMnO_4$, among others. Catalysts containing metals, such as copper, manganese, nickel, cobalt, tungsten, and chromium, among others, either in a soluble form or in a supported or complexed form, have also been mentioned as useful for wastewater oxidation. It is also known that the addition of $SO_2$ type compounds, such as $SO_2$, alkali and alkaline earth sulfites and bisulfites, and related compounds to the wastewater enhances the catalytic oxidation of cyanide, but also increases the oxygen requirements of the total COD reduction system. The concentration of the cyanide or other offensive substances in the wastewater may be too low to treat economically using conventional means, but still too high to meet effluent limitations. Other problems with conventional wastewater treatment processes for streams having relatively low concentrations of offensive substances include high cost, high severity, and the potential for the introduction of undesirable substances into the treated wastewater, such as intentionally added $SO_2$ type compounds and the soluble metal catalysts mentioned above. Even where water insoluble metal catalysts are used, a relatively small ammonia concentration in the wastewater tends to form ammonia-metal complexes and to leach the metal from the catalyst into the treated wastewater. Also, many of the previously known processes for wastewater oxidation may be intolerant of process upsets, for example, significant pH changes may destroy the catalyst, possibly through leaching, precipitation, or destruction of the physical integrity of the catalyst.

The catalytic oxidation of phenol in wastewater has been reviewed by V. S. Mishra, V. V. Mahajani, and J. B. Joshi, "Wet Air Oxidation," 34 *Ind. Eng Chem. Res.* 2–48 (1995). The catalysts mentioned are: Mn/Ce, CuO, ZnO, Pt, Rh, Ir, and Pd. The reaction conditions mentioned are 150°–225° C. and 20.69 MPa (200 atm). These reaction conditions are too severe to be effectively integrated into a refinery or chemical plant wastewater treatment process without extensive modifications.

For the above reasons, it is desired to develop an inexpensive, mild, catalytic wastewater oxidation process that is effective to remove low concentrations of offensive substances, particularly phenol, ammonia, and to reduce COD, and is sufficiently robust to allow recovery from process upsets without replacement of the catalyst. More specifically, it is desired to develop an inexpensive process to catalytically oxidize low concentrations of offensive substances which leaves a low concentration of metal compound in the treated wastewater.

Summary

A treatment method has now been discovered for wastewater containing many offensive substances, including phenol, cresol, ammonia, and other substances that increase wastewater chemical oxygen demand (COD), such as cyanides, sulfides, sulfites, thiosulfates, mercaptans, disulfides, and mixtures thereof. The process catalytically oxidizes the materials using a source of oxygen, and a catalyst comprising a combination of Group VIII and VIA metals or metal compounds on a support which is inert in the hydrothermal conditions of the wastewater treatment.

Industrial wastewater may be biologically treated to reduce the concentration of pollutants contained in the wastewater. A summary of wastewater treatment processes is given in Kirk-Othmer, 24 *Encyclopedia of Chemical Technology*, 227–256 (industrial wastes) and 407–419 (sewage treatment), (1984), incorporated by reference. Rotating biological contactors and activated sludge treatment units use the bacteria, nitrosomonas and nitrobacter, to convert $NH_3$ to $NO_3$ through nitrification in two steps:

Unfortunately, the activities of nitrosomonas and nitrobacter are inhibited by many organic compounds, as discussed below. Through the use of the process of the present invention, wastewater containing phenol and ammonia, and possibly other compounds, is treated using the catalysts described above to reduce the phenol and ammonia concentration and then the treated wastewater is directed to a biological treatment plant, wherein the ammonia concentration is further reduced, e.g., is reduced to 10 ppmw or less, e.g., is reduced to 6 ppmw or less, e.g., is reduced to 3 ppmw or less.

The invention deals with preparation and application of effective catalysts for treating wastewater to remove phenol, cresol, ammonia, and to reduce COD. Another objective is to provide a process scheme and process conditions to apply the catalysts for effective treatment of wastewater. Yet another objective is to provide a cost-effective and environmentally sound process for treating wastewater.

The wastewater from chemical plants and petroleum refineries often contains high concentrations of organic materials, such as phenols, cresols, ammonia and contains other compounds contributing to a high COD, which are difficult to oxidize biologically. For example, a sour water stripper bottom product stream may have a pH of 8.3, chemical oxygen demand (COD) of 2656 ppm by weight, 50 ppm by weight of ammonia, and 600 ppm by weight of phenol. One regulatory limit on the ammonia concentration for the discharge of this stream may be 3 ppm by weight for the monthly average and 6 ppm by weight for the daily maximum. This is a difficult specification to achieve under mild treatment conditions. It has been found that phenol and other materials that may be present in the wastewater, e.g., in sour water stripper bottoms, poison the catalysts that may be used for ammonia removal. Phenol is resistant to biodegradation at concentration levels above about 100 ppm by weight. In addition, phenol also interferes with the biological denitrification process so that $NH_3$ discharge specifications cannot be met. For example, inhibition of 75% of the biological treatment activity is caused by 5.6 ppm of phenol and 300 ppm of potassium thiocyanate. Certain amines are even more deadly. Aniline at <1 ppm inhibits biological treatment activity by 50%. Thus, it is highly desirable to develop a catalyst system to remove phenol and possibly, ammonia, from the wastewater.

Unexpectedly, it has been found that CoMo/C catalyst is active for the removal of phenol and $NH_3$. It has also been found the NiW/C catalyst is more active and stable for phenol removal than the CoMo/C catalyst.

The invention generally provides a method for treating wastewater comprising directing a source of oxygen and a wastewater containing an offensive substance such as phenol, cresol, ammonia, and, optionally, another offensive substance selected from the group consisting of cyanide, sulfide, sulfite, thiosulfate, mercaptan, disulfide, and mixtures thereof over the catalyst in a reaction zone, thereby producing a treated wastewater. The reaction zone should be operated under conditions effective to reduce the concentration of the offensive substance contained in the wastewater, for example, the conditions may include a temperature of from about 50° C. to about 200° C., a pressure of from about 0 to about 1,000 psig, a liquid hourly space velocity (LHSV) of from about 0.1 to about 20 $hr^{-1}$, a ratio of air to the stoichiometric air rate of about 1 to about 10:1. The treated wastewater is discharged from the reaction zone.

One embodiment of the present invention is a method for treating wastewater comprising: (a) directing a source of oxygen and a wastewater containing phenol, ammonia, and, optionally, an offensive substance selected from the group consisting of cyanide, sulfide, sulfite, thiosulfate, mercaptan, disulfide, and mixtures thereof over a catalyst comprising a combination of a Group VIII and a Group VIA metal or metal compound on a support in a reaction zone under treating conditions effective to reduce the concentration of at least one of the phenol, ammonia, or the offensive substance contained in the wastewater and to thereby produce a treated wastewater, wherein the support is inert under the conditions used in the wastewater treatment; and (b) discharging the treated wastewater from the reaction zone Another embodiment of the process of the present invention is a method for treating wastewater comprising: (a) directing a source of oxygen and a wastewater containing phenol, cresol, ammonia, and, optionally, an offensive substance selected from the group consisting of cyanide, sulfide, sulfite, thiosulfate, mercaptan, disulfide, and mixtures thereof, over a catalyst selected from the group of NiMo, NiW, and CoMo on activated carbon in a reaction zone under treating conditions effective to reduce the concentration of at least one of the phenol, cresol, ammonia, and the offensive substance contained in the wastewater and to thereby produce a treated wastewater, the treating conditions comprising a temperature of from about 80° C. to about 145° C., a pressure of from about 10 to about 500 psig, a liquid hourly space velocity of from about 0.5 to about 5 v/v $Hr^{-1}$, and about 1.5 to about 5 mole $O_2$ per mole of chemical oxygen demand due to phenol, cresol, ammonia, and the offensive substance present in the wastewater; and (b) discharging the treated wastewater from the reaction zone. The catalyst may consist essentially of sulfided CoMo on activated carbon or sulfided NiW on activated carbon, wherein the catalyst contains about 0.1 to about 10 weight percent Co or Ni and about 0.2 to about 30 weight percent Mo or W on the activated carbon.

Yet another embodiment of the present invention is a method for treating wastewater comprising: (a) directing a source of oxygen and a wastewater containing phenol, and, optionally, an offensive substance selected from the group consisting of ammonia, cyanide, sulfide, sulfite, thiosulfate, mercaptan, disulfide, and mixtures thereof, over a catalyst in a reaction zone under treating conditions effective to reduce the concentration of the phenol and the offensive substance contained in the wastewater and to thereby produce a treated wastewater, the treating conditions comprising a temperature of from about 80° C. to about 145° C., a pressure of from about 10 to about 500 psig, a liquid hourly space velocity of from about 0.5 to about 5 v/v $Hr^{-1}$, and about 1.5 to about 5 mole $O_2$ per mole of chemical oxygen demand due to phenol, ammonia, and the offensive substance present in the wastewater, the catalyst being selected from the group of sulfided NiMo, sulfided NiW, and sulfided CoMo on activated carbon; and (b) discharging the treated wastewater from the reaction zone.

DETAILED DESCRIPTION

Figure 1:
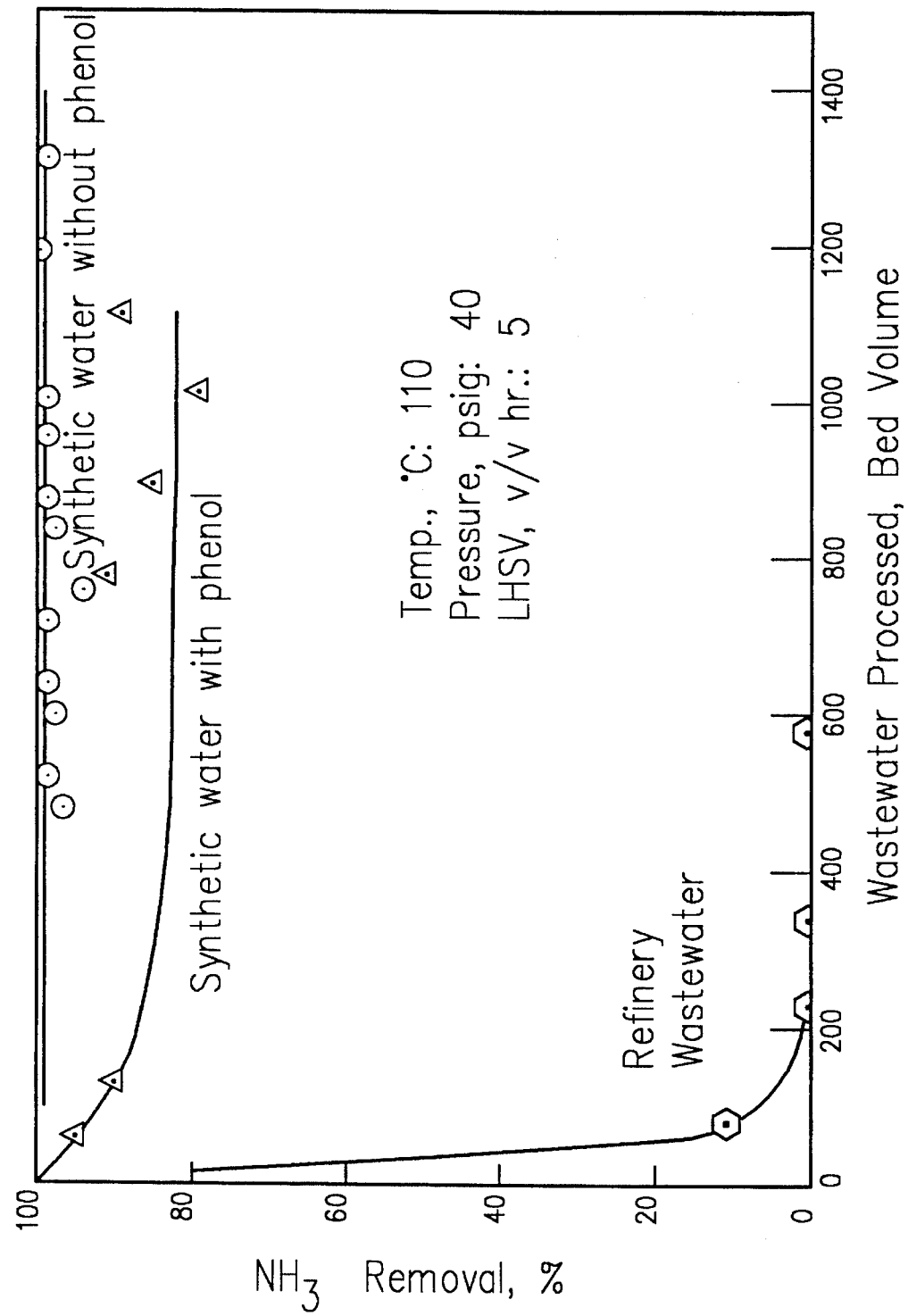
FIG. 1 is a graph showing $NH_3$ removal versus bed volumes of wastewater treated over Cu/C catalyst for three different wastewater compositions.

The invention is a process for reducing the concentration of offensive substances such as phenol, cresol, and ammonia and for oxidizing other COD causing materials, including, for example, cyanide, sulfide, sulfite, thiosulfate, mercaptan, disulfide, and mixtures thereof from wastewater in the presence of a source of oxygen through the use of a catalyst comprising a combination of Group VIII and Group VIA metals or metal compounds on a support which is inert in the hydrothermal conditions of the wastewater treatment. The process is economically advantageous because it employs a long lasting adsorbent/catalyst which effectively oxidizes the materials at mild conditions.

Catalyst

Suitable catalysts comprise a combination of Group VIII and Group VIA metals or metal compounds, particularly NiMo, NiW, and CoMo on a support which is inert in the hydrothermal conditions of the wastewater treatment. Examples of useful supports include activated carbon, porous resins, charcoal, wood, lignite, coke, $TiO_2$, and $ZrO_2$.

Metals can be deposited on the support by impregnation, co-precipitation, ion exchange as well as mulling and physical mixing/shape forming. The impregnation can be sequential, e.g., first impregnate the support with Mo, followed by impregnation with Co, or first impregnate the support with Co, followed by impregnation with Mo. The metals can be also be deposited in one step, e.g., mixing Mo, Co, and activated carbon together and then extruding or forming the materials along with any needed binders or binder precursors into the desired shapes. Metal contents, for example, for CoMo or NiW catalysts, may be in the ranges of about 0.1 to about 10 weight percent Co or Ni, and about 0.2 to about 30 weight percent Mo or W. When the term "metal or metal compound" is used herein, it is intended to include the elemental metal, metal oxides, metal sulfides and other compounds which contain the metal and are catalytically active in the present process, particularly metal sulfides.

Compounds suitable for the impregnation of the catalysts include the water soluble forms or compounds of Co, e.g., cobalt nitrate, Mo, e.g., ammonium paramolybdate, Ni, e.g., nickel nitrate, and W, e.g., ammonium tungstate. The compounds need not include the phthalocyanine compounds, i.e. cobalt phthalocyanine is not needed to impregnate the catalysts of the present invention.

After the metals have been deposited on or incorporated into the catalyst, the catalyst may be dried and calcined at a temperature of from about 100° to about 300° C. in air, nitrogen or another suitable gas. The temperature must be kept below the ignition temperature of the catalyst. It has been found that an activated carbon supported catalyst burned and turned into ash at about 400° C. It has also been found that calcination temperatures of 150° C. and 250° C. are satisfactory.

The catalyst can be activated by reduction or by sulfiding. The catalyst can be reduced through the use of $H_2$ or light hydrocarbons, such as $C_1$, $C_2$, $C_3$, and $C_4$, at temperatures from about 200° C. to about 400° C. The catalyst may be sulfided by use of $H_2S$, $H_2S/H_2$ mixtures, and organic sulfides in hydrocarbons at about 100° C. to about 400° C. and $Na_2S$, $H_2S$, and NaHS in aqueous solutions at about 20° C to about 200° C. The use of $H_2S$ or a $H_2S/H_2$ mixture is preferred. Sulfided catalysts are more active than catalysts that have been reduced.

An advantage of the process of the present invention is that this process can utilize as the catalyst fresh and spent commercial hydrotreating catalysts, e.g., $CoMo/Al_2O_3$, $NiMo/Al_2O_3$, $NiW/Al_2O_3$, or $Mo/Al_2O_3$, hydrocracking catalysts, e.g., $CoMo/Al_2O_3$, $NiMo/Al_2O_3$, $NiW/Al_2O_3$, $Mo/Al_2O_3$, zeolites, or $SiO_2/Al_2O_3$, reforming catalysts, e.g., $Pt/Al_2O_3$, $Pt-Re/Al_2O_3$, or hydrogenation catalysts, e.g., Pd/C, Ni/Kieselguhr, Pt/C, or $Pt/Al_2O_3$. Use of spent catalyst in this process is advantageous due to cost savings due to catalyst reuse and reduction in catalyst disposal requirements for spent catalyst. Careful selection of the specific commercial catalyst is required to avoid problems with the wastewater leaching the metal from the catalyst. The preferred commercial catalyst for this process is spent hydrotreating catalyst, e.g., $CoMo/Al_2O_3$.

It has been discovered that the conventional supports for the metal catalysts, such as alumina or silica-alumina, dissolved and disintegrated in the wastewater at the hydrothermal conditions used in the process of the present invention. It was further discovered that stable catalysts could be prepared using activated carbon as the support. It is noted that activated carbon is not conventionally used as a support for CoMo catalysts or NiW catalysts.

As mentioned above, suitable supports are those that are inert or resistant to decomposition, dissolution, leaching or other damage under the hydrothermal conditions used in the wastewater treatment. The term "inert" as used herein is intended to refer to suitable supports as described immediately above. Any particular solid material is selected for use in the process of this invention with regard to its chemical and physical stabilities under conditions of intended use. With regard to its intended use in aqueous systems, perhaps the most important property of the support is its unreactivity in the aqueous systems as well as its structural integrity under the hydrothermal conditions used for the wastewater treatment.

Non-limiting examples of supports include natural and synthetic zeolites, alumina, silica, silica-alumina, titania and zirconia. Natural zeolites include chabazite, clinoptilolite, erionite, and mordenite. Examples of synthetic zeolites include Zeolite A (U.S. Pat. No. 2,882,243); Zeolite X (U.S. Pat. No. 2,882,244); Zeolite Y (U.S. Pat. No. 3,130,007); ZSM-5 (U.S. Pat. No. 3,702,886 and Re. 29,948); ZSM-11 (U.S. Pat. No. 3,709,979); ZSM-12 (U.S. Pat. No. 3,832,449); ZSM-22 (U.S. Pat. No. 4,556,477); ZSM-23 (U.S. Pat. No. 4,076,842); ZSM-34 (U.S. Pat. No. 4,086,186); ZSM-35 (U.S. Pat. No. 4,016,245); ZSM-48 (U.S. Pat. No. 4,397,827); ZSM-57 (U.S. Pat. No. 4,046,685); and ZSM-58 (U.S. Pat. No. 4,417,780). The entire contents of the above references are incorporated by reference herein.

Other materials that may be useful as supports include the ion-exchange resins and the porous resins that have not been functionalized or impregnated with the active material needed to make them suitable as ion-exchange resins. Examples of ion-exchange resins include those identified by the following tradenames: Allassion A33-03, Amberlite IRA-45, Amberlite IRA-93, De-Acidite G, De-Acidite M, Dowex 3, Imac A-20, Imac A-21, Ionac A-315, Lewatit MP-60, Allassion AWB-3, Anionite EDE-10P, Anionite AV-16, Dowex 44, Duolite A-30B, Duolite A-57, Imac, Ionac A-300, Ionac A-310, Wofatit L150, Anionite AN-2F, De-Acidite E, Duolite A-6, Duolite A-7, Lewatit MIH 59, Wofatit MD, Allassion CC, Amberlite IRC-50, Amberlite IRC-84, Dowex CCR-1, Duolite ES-63, Duolite ES-80, Duolite CS-100, Duolite CS-101, Imac Z-5, Ionac C-270, Kastel C-100, Lewatit CNO, Wofatit CP-300, Wofatit CN, Zeo-Karb 216, Zeo-Karb 226, Dowex 21K, Dowex MS-1, Amberlite IRA-400, Amberlite IRA-900, Amberlite IRA-910, Ionac A-540, Ionac A-641, Amberlite IR-120, Amberlite IR-200, Amberlist-15, Amberlist-1010, Dowex 50, Ionac A-380, Ionac C-240, Ionac C-249, and Ionac C-253. These resins are variously described in U.S. Pat. Nos. 5,292,493 and 4,795,565, incorporated by reference herein.

Materials that are particularly useful as supports include graphite and the various charcoals produced by the destructive distillation of wood, peat, lignite, bituminous coal, nutshells, bones, and other carbonaceous matter, and preferably such bituminous coals and charcoals as have been heat-treated or chemically treated or both, to form a highly porous particle structure of increased adsorption capacity, and generally defined as activated carbon or charcoal.

Activated carbon is commonly available in forms that are identified by the manufacturers as suitable for use in vapor phase applications, e.g., ATOCHEM™ CECARBON™

GAC 616 G and Calgon BPL™, and as suitable for use in liquid phase applications, e.g., ATOCHEM™ CECARBON™ GAC 830 and Calgon CAL™. Due to higher hardness and increased abrasion resistance, carbon designated for vapor phase applications is generally preferred for use in the method of this invention in spite of the fact that the present invention concerns a liquid phase operation. Other activated carbons that may be useful in the process of this invention include ATOCHEM™ CECARBON™ AW 830; DARCO®, Petrodarco A™ and Norit® ROX 0.8 carbon, available from the American Norit Company, Inc., of Jacksonville, Fla.; Alfa™ brand carbon, available from Alfa Products, Danvers, Mass.; and activated carbon materials from Calgon, such as Calgon C™ and Centaur carbon; and similar materials.

The form and the particle size of the support are not critical to the present invention and may vary depending, for example, on the type of reaction system employed. Non-limiting examples of the shapes of the adsorbent for use in the present invention include granules, balls, pebbles, spheres, beads, extrudates, channeled monoliths, microspheres, pellets or structural shapes, such as lobes, pills, cakes, powders, and the like, formed using conventional methods, such as extrusion, pelleting or spray drying. Preferred shapes include granules, beads, balls, pebbles, spheres, extrudates, micirospheres, pellets, and structural shapes. Where, for example, the final particles are designed for use as a fixed or expanded bed, the particles may preferably be formed into particles having a minimum dimension of at least about 0.01 inch and a maximum dimension of up to about one-half inch or one inch or more. Spherical particles having a diameter of about 0.03 inch to about 0.25 inch, preferably about 0.03 inch to about 0.15 inch, are often useful, especially in fixed bed operations. With regard to fluidized bed systems, it is preferred that the major amount by weight of the particles have a diameter in the range of about 10 microns to about 5,000 microns, more preferably about 20 microns to about 1,000 microns.

Process Conditions

The catalysts described above may be advantageously employed to treat wastewater for removal of phenol, cresols, $NH_3$, and for reduction of COD through the removal of other compounds, such as cyanide, sulfide, sulfite, thiosulfate, mercaptan, disulfide, and mixtures thereof.

Reaction conditions for the process of this invention are generally very mild. Suitable reaction conditions are much less severe than those commonly needed for removal of phenol from wastewater, and are particularly much less severe than reaction conditions needed to treat wastewater containing human or animal waste. Examples of reaction conditions that may be employed include:

| Variable | Broad Range | Narrower Range | Narrowest Range |
| --- | --- | --- | --- |
| Pressure, psig | 0 to 2000 | 5 to 1000 | 10 to 500 |
| Temp., °C. | 50 to 200 | 65 to 160 | 80 to 145 |
| LHSV*, v/v Hr. | 0.1 to 20 | 0.3 to 10 | 0.5 to 5 |
| $O_2$/COD*, mol/mol | 1 to 10 | 1 to 8 | 1.5 to 5 |

*Where LHSV is liquid hourly space velocity and COD is chemical oxygen demand, including the oxygen demand require for oxidation of phenol and ammonia.

While suitable temperature ranges are identified above, the process of the present invention is advantageously suitable for use at temperatures less than about 140° C., e.g., less than about 135° C.

According to the method of the present invention, wastewater having a phenol concentration less than about 1000 ppmw, e.g., between about 10 and about 1000 ppmw, and an ammonia concentration less than about 200 ppmw, e.g., between about 1 and about 200 ppmw, may be treated. The phenol concentration may be reduced by at least 30 percent, e.g., at least 50 percent, e.g., at least 75 percent, e.g., by 80 percent or more. The ammonia concentration may be reduced by about 5 to about 20 percent or more. The cresol concentration may be reduced by at least 80 percent, e.g., 90 percent or more. Air, readily available, is the preferred source of oxygen or oxidizing agent; however, other agents include ozone and molecular oxygen, $O_2$. Hydrogen peroxide is not contemplated to be intentionally added as a source of oxygen for this process. Also, no $SO_2$ type compounds are contemplated to be intentionally added in the process of this invention. As used herein the term "SO type compounds" is intended to include compounds such as $SO_2$, alkali and alkaline earth sulfites and bisulfites. The process of this invention is effective with the wastewater and the source of oxygen flowing together either upwardly or downwardly through the reaction zone. Also contemplated is a mode where the wastewater flows downwardly and the source of oxygen flows upwardly through the reaction zone. Representations for the chemistry and the mechanisms for the various oxidation processes follow:

1. Oxidation of Cyanides
   $2CN^- + O_2 \rightarrow 2CNO^-$
   $2CNO^- + \frac{3}{2} O_2 + H_2O \rightarrow N_2(g) + 2CO_2 + 2OH^-$
2. Oxidation of Sulfides
   $S^= + 2O_2 \rightarrow SO_4^=$
3. Oxidation of Sulfites
   $SO_3^= + 0.5 O_2 \rightarrow SO_4^=$
4. Oxidation of Thiosulfates
   $S_2O_3^= + 2O_2 + 2OH^- \rightarrow 2SO_4^= + H_2O$
5. Oxidation of Mercaptans
   $2RSH + 0.5 O_2 \rightarrow RSSR + H_2O$
6. Oxidation of Disulfides
   $S_2^= + 4O_2 \rightarrow 2SO_4^=$
7. Oxidation of Ammonia
   $4NH_3 + 3O_2 \rightarrow 2N_2 + 6H_2O$
8. Oxidation of Phenols
   Phenol + $O_2$ → Intermediates → Acetic Acid + $CO_2$ + $H_2O$
   From U.S. Kulkarni and S. G. Divit, "Destruction of Phenol from Wastewater by Oxidation with $SO_2$—$O_2$," 30 Ind. End. Chem. Res., 1916–1920 (1991).

The reaction products are innocuous or are readily removed in a subsequent biological treatment process. The treated water (oxidized effluent) may be discharged or may be directed to a subsequent biological treatment process, while the gas is treated, flared, or incinerated. Any skim oil present can be recovered in an oil-water separator, preferably a separator drum.

A packed bed provides an effective and efficient contactor. In the packed bed, the reaction zone proceeds along the direction of flow. To minimize the pressure drop across the bed and alleviate potential plugging by debris, the reactor can be operated with the bed expanded slightly, but with less than about 20% expansion. The reactor also can be operated at conditions for an ebullient bed, a fluidized bed, a spouting bed, or in a slurry operation. The use of filters or guard beds may also be helpful to avoid plugging the catalyst bed due to debris.

Example 1

A sample of wastewater produced by a high conversion petroleum refinery contained 76 ppm $NH_3$, 350 ppm phenol, 5.2 ppm cyanide, and had a pH of 8.4. Synthetic wastewater that does not contain intentionally added phenol was prepared by adding 80 ppm of $NH_3$ as $NH_4OH$, 150 ppm of sulfur as thiosulfate, and 100 ppm of sulfide as $Na_2S$ to distilled water. A phenol containing synthetic wastewater was prepared by adding 80 ppm of $NH_3$ as $NH_4OH$, 150 ppm of sulfur as thiosulfate, 100 ppm of sulfide as $Na_2S$, and 100 ppm phenol to distilled water. The reactors were 3/8 inch O.D. stainless steel tubes containing 2 cc of 6×16 mesh ATOCHEM™ Vapor Phase activated carbon. Two cc of solution containing 1000 ppm of $Cu^{++}$ as $Cu(NO_3)_2$ was injected into each of the reactors to soak the activated carbon for ½ hour. It was estimated that essentially all of the $Cu^{++}$ was adsorbed on the activated carbon. The wastewater feed to be treated was pumped upflow through the reactors using a positive displacement (ISCO) pump at 10 cc/hr., 40 psig, and 110° C. Air was co-fed at the bottom of the reactors at 380 cc/hr., i.e., 38 scc of air per cc of wastewater. The product was collected and ammonia determination was done using an ammonia electrode (Orion Model 95-12). About midway through the test using the synthetic wastewater that did not contain phenol, 0.5 ppm of water soluble copper was added to the wastewater feed.

The results of this example are shown in FIG. 1, where it can be seen that a catalytic oxidation process using Cu/C catalyst is not effective for removing $NH_3$ from the refinery wastewater. Except for the initial physical adsorption, no $NH_3$ was removed at all. This result is significantly different than that obtained during the treatment of the synthetic wastewater which does not contain phenol. Compounds present in the refinery wastewater appear to have poisoned or inactivated the catalyst. The refinery wastewater is a complex mixture and may contain many compounds that potentially act as catalyst poisons. As shown in FIG. 1, phenol is a mild poison, reducing the $NH_3$ removal from near 100% to a little over 80% when 100 ppm of phenol was added to the synthetic wastewater. The other compounds present in the refinery wastewater that act as catalyst poisons have not been identified at this time.

Example 2

Figure 2:
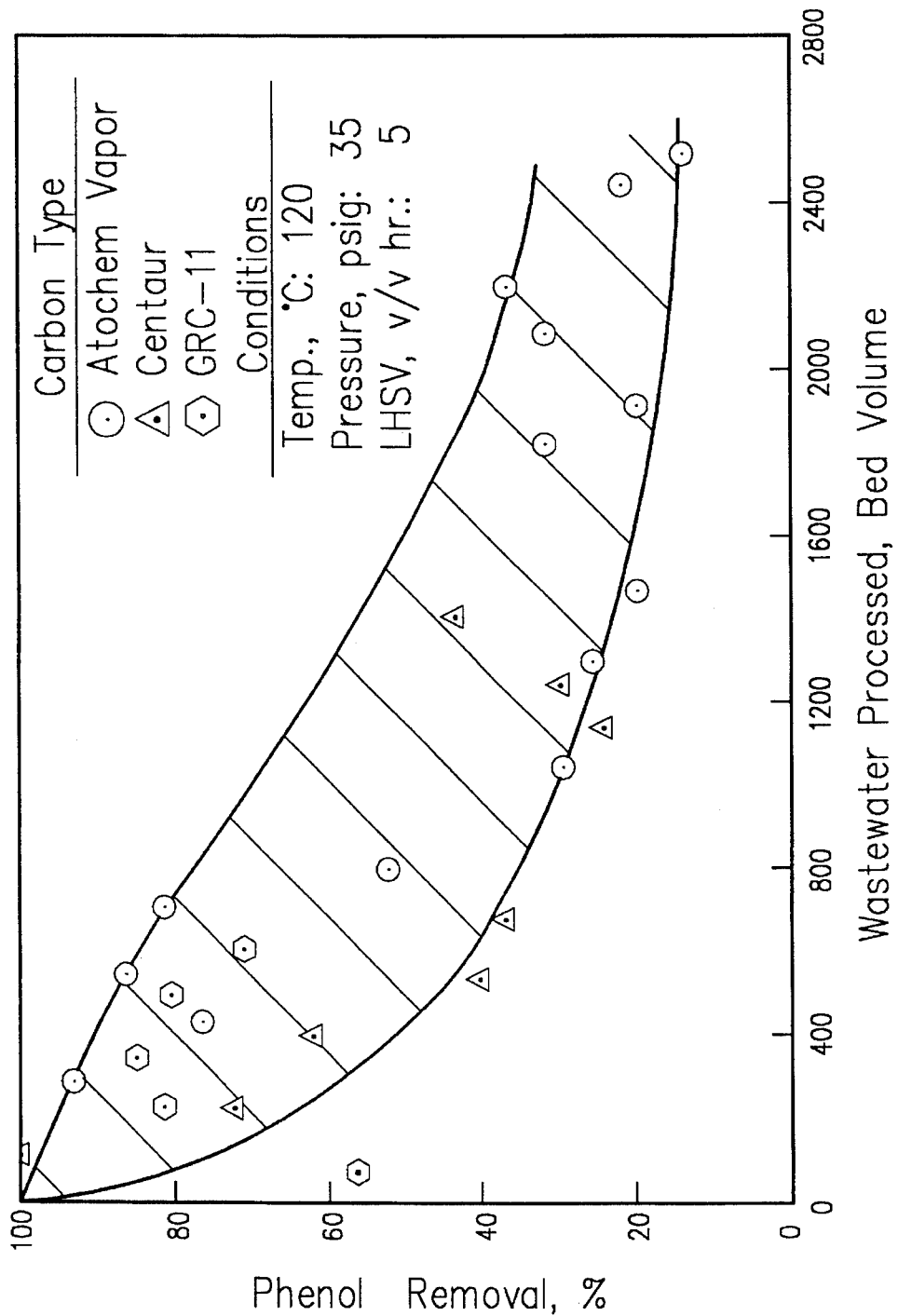
FIG. 2 is a graph showing phenol removal levels versus bed volumes of wastewater treated over Cu/C catalyst for three different activated carbons.

The refinery wastewater was tested for phenol removal using a similar procedure to that of Example 1 and using 2 cc each of ATOCHEM™ Vapor Phase activated carbon, Calgon Centaur activated carbon and Calgon GRC-11 activated carbon impregnated by contacting them with 2 cc of solution containing 1000 ppm of $Cu^{++}$ as $Cu(NO_3)_2$ for ½ hour. The reactors were 3/8 inch O.D. stainless steel tubes containing 2 cc of each of the catalysts described above in a 6×16 mesh size. The test was run at 120° C., 35 psig, and a liquid hourly space velocity (LHSV) of 5 v/v-hr. The phenol determination was done using a gas chromatograph (GC). The results of this experiment are shown in FIG. 2.

The efficacy of the three types of activated carbon tested for phenol removal appears to be comparable. The phenol removal was high initially due to adsorption and then stabilized at 20 to 40%. This level of phenol removal is not sufficient to reduce the inhibition for nitrification in a biological treatment plant. It is desired to achieve a phenol removal of at least 70 or 75 percent.

Example 3

The following catalysts were prepared:

| Catalyst Number | Description |
|---|---|
| (1) | Cu/C: 2 cc of 1000 ppm Cu in a $CuSO_4$ solution was added to 2 cc of ATOCHEM ™ Vapor Phase activated carbon in the reactor. |
| (2) | Cu/C: 2 cc of 1000 ppm Cu in a $CuSO_4$ solution was added to 2 cc of Calgon Centaur activated carbon in the reactor. |
| (3) | Cu/C: 2 cc of 1000 ppm Cu in a $CuSO_4$ solution was added to 2 cc of Calgon GRC-11 activated carbon in the reactor. |
| (4) | Co/C: 2 cc of 1000 ppm Co in a $Co(NO_3)_2$ solution was added to 2 cc of ATOCHEM ™ Vapor Phase activated carbon in the reactor. |
| (5) | Pt/C: 2 cc of Calgon PCB activated carbon was impregnated with $H_2PtCl_6$ to 0.2% Pt level and calcined at 150° C. |
| (6) | Pt/ZSM-34: 2 cc of Zeolite ZSM-34 was impregnated with $H_2PtCl_6$ to 0.2% Pt level and calcined at 150° C. |
| (7) | Pt/C: 2 cc of Calgon GRC-11 was impregnated with $H_2PtCl_6$ to 0.2% Pt level and calcined at 150° C. |
| (8) | Cu/C: 2 cc of Calgon GRC-11 activated carbon was impregnated to 10 wt. % Cu using $Cu(NO_3)_2$ solution and heated to 150° C. |
| (9) | Cu/C: 2 cc of Calgon PCB activated carbon was impregnated to 10 wt. % Cu using $Cu(NO_3)_2$ solution and heated to 150° C. |
| (10) | CoMo/$Al_2O_3$: 5 cc of Akzo KF-742 catalyst. |
| (11) | CoMoS/C: 5 cc of ATOCHEM ™ Vapor Phase activated carbon was impregnated with 4 wt. % Co and then 10 wt. % Mo. After drying, the catalyst was sulfided by heating it in 1% $H_2S$ in 99% $H_2$ gas to 300° C. for 2 hours. |
| (12) | CoMo/C: 5 cc of ATOCHEM ™ Vapor Phase activated carbon was impregnated with 4 wt. % Co and then 10 wt. % Mo. After drying, the catalyst was heated in $N_2$ gas to 150° C. |
| (13) | CoMo/C: 5 cc of Calgon PCB activated carbon was impregnated with 10 wt. % Mo and then 4 wt. % Co. After drying, the catalyst was heated to 300° C. in flowing $H_2$ for reduction. |
| (14) | NiMo/$Al_2O_3$: 5 cc of Topsoe TK771 catalyst. |
| (15) | NiMo/C: 5 cc of ATOCHEM ™ Vapor Phase activated carbon was impregnated with 5 wt. % Ni and then 10 wt. % Mo. After drying, the catalyst was sulfided with 1% $H_2S$ and 99% $H_2$ gas at 300° C. |
| (16) | CoMo/C: 5 cc of ATOCHEM ™ Vapor Phase activated carbon was impregnated with 10 wt. % Mo and then 4 wt. % Co. After drying, the catalyst was heated to 300° C. in flowing $H_2$ for reduction. |
| (17) | CoMo/C: 2 cc of ATOCHEM ™ Vapor Phase activated carbon was impregnated with 4 wt. % Co and then 10 wt. % Mo. After drying, the catalyst was heated in $N_2$ gas to 150° C. Two cc of the catalyst was loaded into the reactor as the top bed along with 2 cc of catalyst (18), below as the bottom bed, and then both catalysts were sulfided using 1% $H_2S$ and 99% $H_2$ at 120° C. |
| (18) | CuS/C: 2 cc of ATOCHEM ™ Vapor Phase activated carbon was impregnated to 5 wt. % Cu using $Cu(NO_3)_2$ solution. The catalyst was dried at 150° C. and then sulfided in the reactor along with catalyst 17 using 1% $H_2S$ and 99% $H_2$ at 100° C. |
| (19) | NiWS/C: 2 cc of ATOCHEM ™ Vapor Phase activated carbon was impregnated with 10 wt. % W and the 4 wt. % Ni. After drying at 150° C., the catalyst was sulfided with $H_2S$ at 100° C. for three hours. |
| (20) | NiWS/C: 2 cc of ATOCHEM ™ Vapor Phase activated carbon was impregnated with 10 wt. % W and the 4 wt. % Ni. After drying at 150° C., the catalyst was sulfided with $H_2S$ at 120° C. for three hours. |

A sourwater stripper bottoms sample was obtained from a high conversion refinery. To this sourwater stripper bottoms sample, the following compounds were added: 80 ppm $NH_3$, 150 ppm sulfur as thiosulfate, 100 ppm sulfur as $Na_2S$, and 100 ppm phenol. The total $NH_3$ content in this synthetic wastewater was 150 ppm and the pH of this wastewater was adjusted to 8.4. A second sample of sourwater stripper bottoms was obtained from a high conversion refinery. This second sourwater stripper bottoms sample had a pH of 8.3; COD of 2656 ppm; $NH_3$ of 50 ppm; chloride of 1000 ppm; phenol of 600 ppm; and contained other heavy organic materials, such as cresols.

The reactors were ⅜ inch O.D. stainless steel tubes containing 2 or 5 cc of 6×16 mesh of catalysts 1 through 20. Screens were used at the top and the bottom of the catalyst bed. The feeds described above were pumped upflow through the reactor using a positive displacement (ISCO) pump at various rates, pressures and temperatures. The synthetic or spiked sourwater stripper bottoms was fed to all catalysts except where the second sourwater is specifically identified as the feed. Air was co-fed at the bottom of the reactor at 200 or 300 scc per cc of wastewater feed. The product was collected, $NH_3$ determination was done using an Orion ammonia electrode (Model 95–12), and phenol and cresol determination was done using a gas chromatograph (GC). The results are shown below in Tables 1–19.

Catalysts containing copper, cobalt, molybdenum, and tungsten alone on activated carbon are ineffective for the removal of ammonia and phenol in this application. CoMo catalysts supported on alumina:showed a high initial activity for ammonia removal, however, the alumina support disintegrated within a few days. Unexpectedly, CoMo catalysts supported on activated carbon showed good activity and stability for ammonia, phenol and cresol removal. Also unexpectedly, NiW catalysts supported on activated carbon showed good activity and stability for ammonia, phenol and cresol removal. In particular, the NiW catalysts of the present invention are 40°–50° C. more active for phenol removal than other catalysts. Stainless steel is not a suitable material for reactor construction for the catalytic oxidation of streams such as sourwater stripper bottoms, which contain between 600 and 1000 ppm chlorides. Reactors made of Hastelloy Alloy C may be suitable.

TABLE 1

| Catalyst No. | Bed Volume, Cumulative | Test Temp., °C. | LHSV v/v Hr. | Press. psig | Air Rate, scc/cc | Removal, wt. % $NH_3$ | Removal, wt. % Phenol |
|---|---|---|---|---|---|---|---|
| 1 | 33 | 120 | 2 | 89 | 200 | 1.1 | 0 |
| 1 | 169 | 120 | 2 | 89 | 200 | 4.6 | <1 |
| 1 | 217 | 140 | 2 | 89 | 200 | 5.5 | 2.1 |
| 1 | 265 | 140 | 2 | 89 | 200 | 5.7 | 1.1 |
| 1 | 361 | 160 | 2 | 91 | 200 | 6.3 | 4.9 |

TABLE 2

| Catalyst No. | Bed Volume, Cumulative | Test Temp., °C. | LHSV v/v Hr. | Press. psig | Air Rate, scc/cc | Removal, wt. % $NH_3$ | Removal, wt. % Phenol |
|---|---|---|---|---|---|---|---|
| 2 | 208 | 140 | 2 | 90 | 200 | 3.8 | 2.5 |
| 2 | 256 | 140 | 2 | 90 | 200 | 4.7 | 2.3 |
| 2 | 304 | 160 | 2 | 90 | 200 | 5.1 | 6.9 |

TABLE 3

| Catalyst No. | Bed Volume, Cumulative | Test Temp., °C. | LHSV v/v Hr. | Press. psig | Air Rate, scc/cc | Removal, wt. % NH₃ | Removal, wt. % Phenol |
|---|---|---|---|---|---|---|---|
| 3 | 160 | 120 | 1 | 89 | 200 | <1 | 1.5 |
| 3 | 208 | 140 | 2 | 89 | 200 | 3.2 | 2 |
| 3 | 256 | 140 | 2 | 89 | 200 | 3.5 | 2.8 |
| 3 | 304 | 160 | 2 | 89 | 200 | 4.9 | 5.7 |
| 3 | 352 | 160 | 2 | 89 | 200 | 5.3 | 6.5 |

TABLE 4

| Catalyst No. | Bed Volume, Cumulative | Test Temp., °C. | LHSV v/v Hr. | Press. psig | Air Rate, scc/cc | Removal, wt. % NH₃ | Removal, wt. % Phenol |
|---|---|---|---|---|---|---|---|
| 4 | 160 | 120 | 1 | 89 | 200 | <1 | <1 |
| 4 | 208 | 140 | 2 | 90 | 200 | 2.1 | 1.4 |
| 4 | 256 | 140 | 2 | 90 | 200 | 2.4 | 2.2 |
| 4 | 304 | 160 | 2 | 90 | 200 | 4.3 | 2.9 |
| 4 | 352 | 160 | 2 | 90 | 200 | 4.6 | 3.6 |

TABLE 5

| Catalyst No. | Bed Volume, Cumulative | Test Temp., °C. | LHSV v/v Hr. | Press. psig | Air Rate, scc/cc | Removal, wt. % NH₃ | Removal, wt. % Phenol |
|---|---|---|---|---|---|---|---|
| 5 | 36 | 120 | 2 | 250 | 200 | 5.6 | 4.2 |
| 5 | 50 | 120 | 2 | 500 | 200 | 8.8 | 4.5 |
| 5 | 84 | 120 | 2 | 500 | 200 | 11.8 | 4.9 |
| 5 | 98 | 140 | 2 | 500 | 200 | 15.3 | 5.4 |
| 5 | 258 | 140 | 2 | 500 | 200 | 25.1 | 6.8 |
| 5 | 356 | 150 | 2 | 500 | 200 | 19.6 | 7.1 |

TABLE 6

| Catalyst No. | Bed Volume, Cumulative | Test Temp., °C. | LHSV v/v Hr. | Press. psig | Air Rate, scc/cc | Removal, wt. % NH₃ | Removal, wt. % Phenol |
|---|---|---|---|---|---|---|---|
| 6 | 48 | 120 | 2 | 500 | 200 | 32.9 | 1.1 |
| 6 | 80 | 120 | 2 | 500 | 200 | <1 | 1.5 |
| 6 | 96 | 140 | 2 | 500 | 200 | 2.3 | 1.3 |
| 6 | 283.5 | 140 | 2 | 500 | 200 | <1 | 1.1 |
| 6 | 331.5 | 160 | 2 | 500 | 200 | <1 | |

TABLE 7

| Catalyst No. | Bed Volume, Cumulative | Test Temp., °C. | LHSV v/v Hr. | Press. psig | Air Rate, scc/cc | Removal, wt. % NH₃ | Phenol |
|---|---|---|---|---|---|---|---|
| 7 | 33 | 120 | 2 | 500 | 200 | 13.3 | 1.8 |
| 7 | 81 | 120 | 2 | 500 | 200 | 8.7 | 2.6 |
| 7 | 269 | 140 | 1 | 500 | 200 | 9.8 | 3.2 |
| 7 | 283.5 | 160 | 2 | 500 | 200 | 5.4 | 4.5 |

TABLE 8

| Catalyst No. | Bed Volume, Cumulative | Test Temp., °C. | LHSV v/v Hr. | Press. psig | Air Rate, scc/cc | Removal, wt. % NH₃ | Phenol |
|---|---|---|---|---|---|---|---|
| 8 | 187 | 120 | 2 | 500 | 200 | 25.5 | 3.6 |
| 8 | 235 | 140 | 2 | 500 | 200 | 16.8 | 4.1 |
| 8 | 283 | 160 | 2 | 500 | 200 | 6.3 | 4.9 |

TABLE 9

| Catalyst No. | Bed Volume, Cumulative | Test Temp., °C. | LHSV v/v Hr. | Press. psig | Air Rate, scc/cc | Removal, wt. % NH₃ | Phenol |
|---|---|---|---|---|---|---|---|
| 9 | 187 | 120 | 2 | 500 | 200 | 18.6 | 2.8 |
| 9 | 235 | 140 | 2 | 500 | 200 | 15.3 | 3.2 |
| 9 | 283 | 160 | 2 | 500 | 200 | 4.4 | 3.3 |

TABLE 10

| Catalyst No. | Bed Volume, Cumulative | Test Temp., °C. | LHSV v/v Hr. | Press. psig | Air Rate, scc/cc | Removal, wt. % NH₃ | Phenol |
|---|---|---|---|---|---|---|---|
| 10 | 187 | 120 | 2 | 80 | 300 | 59 | |
| 10 | 235 | 140 | 2 | 80 | 300 | 62 | |
| 10 | 283 | 160 | 2 | 80 | 300 | 67.2 | |

TABLE 11

| Catalyst | Bed Volume, Cumulative | Test Temp., °C. | LHSV v/v Hr. | Press. psig | Air Rate, scc/cc | Removal, wt. % NH₃ | Phenol | Cresol | Prod. pH |
|---|---|---|---|---|---|---|---|---|---|
| \multicolumn{10}{c}{Synthetic sourwater as feed:} |
| 11 | 75 | 120 | 1 | 80 | 300 | 55.1 | | | |
| 11 | 90 | 120 | 2 | 80 | 300 | 54.6 | | | |
| 11 | 123 | 140 | 1 | 80 | 300 | 67.3 | | | |
| 11 | 138 | 140 | 2 | 80 | 300 | 65.9 | | | |
| 11 | 171 | 140 | 2 | 120 | 300 | 69.9 | | | |
| 11 | 219 | 120 | 2 | 120 | 300 | 72.3 | | | |
| 11 | 243 | 120 | 1 | 120 | 300 | 69.7 | | | |
| 11 | 318 | 110 | 1 | 80 | 300 | 62.7 | | | |
| 11 | 351 | 110 | 2 | 80 | 300 | 61.6 | | | |
| 11 | 399 | 110 | 2 | 40 | 300 | 55.8 | | | |
| 11 | 447 | 110 | 2 | 40 | 300 | 56.6 | | | |
| 11 | 495 | 110 | 2 | 80 | 300 | 57.3 | | | |
| 11 | 567 | 110 | 1 | 80 | 300 | 56.9 | | | |
| 11 | 615 | 110 | 2 | 80 | 300 | 58.4 | | | |
| 11 | 663 | 110 | 2 | 80 | 300 | 58.5 | | | |
| 11 | 759 | 110 | 2 | 80 | 300 | 55.8 | | | |
| 11 | 834 | 110 | 1 | 80 | 300 | 58.7 | | | |
| 11 | 882 | 110 | 2 | 80 | 300 | 55.2 | | | |
| 11 | 930 | 110 | 2 | 80 | 300 | 54.4 | | | |
| 11 | 978 | 110 | 2 | 80 | 300 | 52.7 | | | |
| 11 | 1026 | 110 | 2 | 80 | 300 | 53.3 | | | |
| 11 | 1099 | 110 | 1 | 80 | 300 | 55.9 | | | |
| 11 | 1147 | 110 | 2 | 80 | 300 | 53 | | | |
| 11 | 1195 | 110 | 2 | 80 | 300 | 54.1 | | | |
| 11 | 1243 | 110 | 2 | 80 | 300 | 53.2 | | | |
| 11 | 1291 | 110 | 2 | 80 | 300 | 51.5 | | | |
| 11 | 1364 | 110 | 1 | 80 | 300 | 52.6 | | | |
| \multicolumn{10}{c}{Second sourwater stripper bottoms sample as feed:} |
| 11 | 1412 | 110 | 2 | 80 | 300 | 39.7 | | | |
| 11 | 1460 | 110 | 2 | 80 | 300 | 44 | 83.0 | | |
| 11 | 1532 | 110 | 1 | 80 | 300 | 45.6 | 83.2 | | |
| 11 | 1580 | 110 | 2 | 80 | 300 | 45.1 | 81.5 | | |
| \multicolumn{10}{c}{Feed pH adjusted to 5.4:} |
| 11 | 1628 | 110 | 2 | 80 | 100 | 44.8 | | | 5.4 |
| 11 | 1688 | 110 | 1 | 80 | 200 | 45 | 43.2 | 84.1 | 7.4 |
| 11 | 1736 | 110 | 2 | 80 | 300 | 43.6 | 17.6 | 42.0 | 7.6 |
| 11 | 1784 | 120 | 2 | 80 | 300 | 44.5 | 46.0 | 65.6 | 8.2 |
| \multicolumn{10}{c}{Second sourwater stripper bottoms sample as feed, feed pH at 8.4:} |
| 11 | 1822.4 | 120 | 2 | 80 | 300 | 19.2 | 28.1 | 48.9 | 7.0 |
| 11 | 1860.8 | 120 | 2 | 80 | 300 | 13.3 | 12.7 | 25.8 | 7.4 |

TABLE 12

| Catalyst No. | Bed Volume, Cumulative | Test Temp., °C. | LHSV v/v Hr. | Press. psig | Air Rate, scc/cc | Removal, wt. % NH₃ | Phenol |
|---|---|---|---|---|---|---|---|
| 12 | 33 | 120 | 2 | 80 | 300 | 17.6 | |
| 12 | 50 | 120 | 1 | 80 | 300 | 23.3 | |

TABLE 13

| Catalyst No. | Bed Volume, Cumulative | Test Temp., °C. | LHSV v/v Hr. | Press. psig | Air Rate, scc/cc | Removal, wt. % NH₃ | Phenol |
|---|---|---|---|---|---|---|---|
| 13 | 41 | 120 | 2 | 80 | 300 | 65.4 | |
| 13 | 113 | 120 | 1 | 80 | 300 | 55.6 | |
| 13 | 161 | 120 | 2 | 80 | 300 | 50.3 | |
| 13 | 209 | 120 | 2 | 80 | 300 | 48.8 | |
| 13 | 257 | 120 | 2 | 80 | 300 | 46.3 | |

TABLE 14

| Catalyst No. | Bed Volume, Cumulative | Test Temp., °C. | LHSV v/v Hr. | Press. psig | Air Rate, scc/cc | Removal, wt. % NH₃ | Phenol |
|---|---|---|---|---|---|---|---|
| 14 | 33 | 120 | 2 | 80 | 300 | 14.3 | |

TABLE 15

| Catalyst No. | Bed Volume, Cumulative | Test Temp., °C. | LHSV v/v Hr. | Press. psig | Air Rate, scc/cc | Removal, wt. % NH₃ | Phenol |
|---|---|---|---|---|---|---|---|
| 15 | 17 | 120 | 1 | 80 | 300 | 46.3 | |
| 15 | 65 | 120 | 2 | 80 | 300 | 43.2 | |
| 15 | 113 | 140 | 2 | 80 | 300 | 49.8 | |
| 15 | 185 | 110 | 1 | 80 | 300 | 32.5 | |
| 15 | 233 | 110 | 2 | 80 | 300 | 30.6 | |
| 15 | 281 | 140 | 2 | 80 | 300 | 33.3 | |
| 15 | 329 | 140 | 2 | 80 | 300 | 29.5 | |
| 15 | 377 | 140 | 2 | 80 | 300 | 27.6 | |
| 15 | 449 | 140 | 1 | 80 | 300 | 25.9 | |
| 15 | 497 | 140 | 2 | 80 | 300 | 26.4 | |

TABLE 16

| Catalyst No. | Bed Volume, Cumulative | Test Temp., °C. | LHSV v/v Hr. | Press. psig | Air Rate, scc/cc | Removal, wt. % NH₃ | Phenol |
|---|---|---|---|---|---|---|---|
| 16 | 75 | 120 | 1 | 80 | 300 | 66.8 | |
| 16 | 92 | 110 | 2 | 80 | 300 | 63.2 | |
| 16 | 116 | 110 | 1 | 80 | 300 | 66 | |
| 16 | 140 | 110 | 2 | 40 | 300 | 51.5 | |
| 16 | 188 | 110 | 2 | 40 | 300 | 47.8 | |
| 16 | 260 | 110 | 1 | 40 | 300 | 45.5 | |
| 16 | 308 | 110 | 2 | 40 | 300 | 46.3 | |
| 16 | 356 | 110 | 2 | 40 | 300 | 44.4 | |

TABLE 17

| Catalyst | Bed Volume, Cumulative | Test Temp., °C. | LHSV v/v Hr. | Press. psig | Air Rate, scc/cc | Removal, wt. % NH₃ | Phenol | Cresol | Prod. pH |
|---|---|---|---|---|---|---|---|---|---|
| | | Second sourwater sample as feed: | | | | | | | |
| 17 & 18 | 16.5 | 110 | 1 | 80 | 300 | 49.1 | 92.5 | 99 | |
| | | Feed pH at 4.6: | | | | | | | |
| 17 & 18 | 64.5 | 110 | 2 | 80 | 300 | 47.3 | 92.8 | 99 | 4.6 |
| 17 & 18 | 152 | 110 | 1 | 80 | 200 | 48.8 | 60.7 | 99 | 7.1 |
| 17 & 18 | 200 | 110 | 2 | 80 | 300 | 45.2 | 50.0 | 90.2 | 7.3 |
| 17 & 18 | 248 | 120 | 2 | 80 | 300 | 47.2 | 59.9 | 91.2 | 7.7 |
| | | Feed pH at 8.4: | | | | | | | |
| 17 & 18 | 296 | 120 | 2 | 80 | 300 | 39.1 | 62.0 | 89.7 | 7.7 |
| 17 & 18 | 344 | 120 | 2 | 80 | 300 | 30.6 | | | 7.6 |
| 17 & 18 | 425 | 120 | 1 | 80 | 300 | 18.7 | 64.6 | 92.1 | 7.5 |
| 17 & 18 | 473 | 120 | 2 | 80 | 300 | 17.9 | 77.4 | 99 | 7.4 |
| 17 & 18 | 521 | 120 | 2 | 80 | 300 | 14.1 | 80.0 | 99 | 7.5 |
| 17 & 18 | 569 | 120 | 2 | 80 | 300 | 10 | 62.6 | 90.3 | 7.6 |
| 17 & 18 | 656.5 | 120 | 1 | 80 | 300 | 6.9 | 58.7 | 90.2 | 7.7 |
| 17 & 18 | 704.5 | 120 | 2 | 80 | 300 | 7.3 | 70.0 | 92.8 | 7.6 |
| 17 & 18 | 752.5 | 120 | 2 | 80 | 300 | 8.8 | 64.6 | 84.4 | 6.7 |
| 17 & 18 | 800.5 | 120 | 2 | 80 | 300 | 11.1 | 45.1 | 74.2 | 7.0 |
| 17 & 18 | 848.5 | 120 | 2 | 80 | 300 | 10.6 | 9.9 | 37.9 | 7.4 |

TABLE 17-continued

| Catalyst | Bed Volume, Cumulative | Test Temp., °C. | LHSV v/v Hr. | Press. psig | Air Rate, scc/cc | Removal, wt. % NH₃ | Phenol | Cresol | Prod. pH |
|---|---|---|---|---|---|---|---|---|---|
| Second sourwater sample as feed and catalyst resulfided with H₂S at 120° C.: | | | | | | | | | |
| 17 & 18 | 936 | 120 | 2 | 80 | 300 | 14.4 | 13.6 | 53.2 | 7.1 |
| Catalyst reimpregnated with 10 wt. % Mo, 4 wt. % Co, and resulfided with H₂S at 120° C.: | | | | | | | | | |
| 17 & 18 | 968 | 120 | 2 | 80 | 300 | 15.4 | 52.3 | 78.6 | 7.3 |
| 17 & 18 | 1016 | 120 | 2 | 80 | 300 | 18.4 | 28.2 | 92.0 | 7.2 |

TABLE 18

| Catalyst | Bed Volume, Cumulative | Test Temp., °C. | LHSV v/v Hr. | Press. psig | Air Rate, scc/cc | Removal, wt. % NH₃ | Phenol | Cresol | Prod. pH |
|---|---|---|---|---|---|---|---|---|---|
| Second sourwater sample as feed, feed pH at 8.4: | | | | | | | | | |
| 19 | 180 | 120 | 1 | 80 | 300 | 60.1 | 88.8 | 99 | 5.8 |
| 19 | 228 | 120 | 2 | 80 | 300 | 33.2 | 99 | 99 | 6.5 |
| 19 | 276 | 120 | 2 | 80 | 300 | 29.5 | 72.5 | 90 | 6.7 |
| 19 | 324 | 120 | 2 | 80 | 300 | 18.1 | 77.5 | 93.2 | 6.9 |
| 19 | 372 | 120 | 2 | 80 | 300 | 15.5 | 77.7 | 99 | 6.7 |
| 19 | 547 | 120 | 1 | 80 | 300 | 10.1 | 77.2 | 99 | 6.3 |
| 19 | 595 | 120 | 2 | 80 | 300 | 13.6 | 83.1 | 99 | 6.2 |
| 19 | 643 | 120 | 2 | 80 | 300 | 10.8 | 86.4 | 99 | 6.6 |
| 19 | 691 | 120 | 2 | 80 | 300 | 15.1 | 92.4 | 99 | 6.5 |
| 19 | 739 | 120 | 2 | 80 | 300 | 13.7 | 83.4 | 99 | 6.6 |
| 19 | 914 | 120 | 1 | 80 | 300 | 11.6 | 92.0 | 99 | 6.5 |
| 19 | 962 | 120 | 2 | 80 | 300 | 10.8 | 94.8 | 99 | 6.9 |
| 19 | 1058 | 120 | 2 | 80 | 300 | 9.7 | 84.52 | 99 | 7.0 |
| 19 | 1106 | 120 | 2 | 80 | 300 | 10.1 | 58.2 | 99 | 6.9 |
| 19 | 1281 | 120 | 1 | 80 | 300 | 14.5 | 75.0 | 91.5 | 7.1 |
| 19 | 1329 | 120 | 2 | 80 | 300 | 10.1 | 45.9 | 51.4 | 7.4 |
| The reactor failed and was replaced. | | | | | | | | | |
| 19 | 1377 | 120 | 2 | 80 | 250 | 12.7 | 38.2 | 51.2 | 7.4 |
| 19 | 1425 | 120 | 2 | 80 | 250 | 10.5 | 11.2 | 34.3 | 7.5 |
| 19 | 1575 | 120 | 2 | 80 | 300 | 8.6 | 0 | 0 | 7.5 |

TABLE 19

| Catalyst | Bed Volume, Cumulative | Test Temp., °C. | LHSV v/v Hr. | Press. psig | Air Rate, scc/cc | Removal, wt. % NH₃ | Phenol | Cresol | Prod. pH |
|---|---|---|---|---|---|---|---|---|---|
| Second sourwater sample as feed, feed pH at 8.4: | | | | | | | | | |
| 20 | 175 | 120 | 2 | 80 | 300 | 22.2 | 87.4 | 99 | 5.1 |
| 20 | 350 | 120 | 1 | 40 | 300 | 18.6 | 54.3 | 99 | 5.4 |
| 20 | 398 | 120 | 2 | 80 | 300 | 13.7 | 77.0 | 99 | 6.2 |
| 20 | 446 | 120 | 2 | 80 | 300 | 10.1 | 99 | 99 | 6.3 |
| 20 | 494 | 120 | 2 | 80 | 300 | 14.9 | 99 | 99 | 6.4 |
| 20 | 644 | 120 | 1 | 80 | 300 | 12.1 | 99 | 99 | 6.6 |

What is claimed is:

1. A method for treating wastewater comprising:

(a) directing a source of oxygen and a wastewater containing phenol, cresol, ammonia, and, optionally, an offensive substance selected from the group consisting of cyanide, sulfide, sulfite, thiosulfate, mercaptan, disulfide, and mixtures thereof, over a catalyst selected from the group of NiMo, NiW, and CoMo on activated carbon in a reaction zone under treating conditions effective to reduce the concentration of at least one of the phenol, cresol, ammonia, and the offensive substance contained in the wastewater and to thereby produce a treated wastewater, the treating conditions comprising a temperature of from about 80° C. to about 145° C., a pressure of from about 10 to about 500 psig, a liquid hourly space velocity of from about 0.5 to about 5 v/v Hr$^{-1}$, and about 1.5 to about 5 mole $O_2$ per mole of chemical oxygen demand due to phenol, cresol, ammonia, and the offensive substance present in the wastewater; and (b) discharging the treated wastewater from the reaction zone.

2. The method according to claim 1, wherein the catalyst comprises NiMo.

3. The method according to claim 1, wherein the catalyst comprises NiW.

4. The method according to claim 1, wherein the catalyst comprises CoMo.

5. The method according to claim 1 comprising directing the source of oxygen and the wastewater to flow in the same direction over the catalyst.

6. The method according to claim 1 comprising directing the source of oxygen and the wastewater to flow in opposite directions over the catalyst.

7. The method according to claim 1 comprising a source of oxygen which contains no intentionally added hydrogen peroxide.

8. The method according to claim 1 comprising a wastewater which contains no intentionally added $SO_2$ type compounds.

9. The method according to claim 1, wherein the treating conditions comprise a temperature of less than about 140° C.

10. The method according to claim 1, wherein the catalyst is activated prior to use by reducing the catalyst or by sulfiding the catalyst.

11. The method according to claim 10, wherein the catalyst is in-situ sulfided prior to use.

12. The method according to claim 1, wherein the treated wastewater that is discharged from the reaction zone is directed to a biological treatment process, wherein the concentration of ammonia is further reduced.

13. The method according to claim 12, wherein the catalyst consists essentially of sulfided CoMo on activated carbon or sulfided NiW on activated carbon, wherein the catalyst contains about 0.1 to about 10 weight percent Co or Ni and about 0.2 to about 30 weight percent Mo or W on the activated carbon.

14. A method for treating wastewater comprising:

(a) directing a source of oxygen and a wastewater containing phenol, and, optionally, an offensive substance selected from the group consisting of ammonia, cyanide, sulfide, sulfite, thiosulfate, mercaptan, disulfide, and mixtures thereof, over a catalyst in a reaction zone under treating conditions effective to reduce the concentration of the phenol and the offensive substance contained in the wastewater and to thereby produce a treated wastewater, the treating conditions comprising a temperature of from about 80° C. to about 145° C., a pressure of from about 10 to about 500 psig, a liquid hourly space velocity of from about 0.5 to about 5 v/v $Hr^{-1}$, and about 1.5 to about 5 mole $O_2$ per mole of chemical oxygen demand due to phenol, ammonia, and the offensive substance present in the wastewater, the catalyst being selected from the group of sulfided NiMo, sulfided NiW, and sulfided CoMo on activated carbon; and (b) discharging the treated wastewater from the reaction zone.

* * * * *